(12) United States Patent
Gallagher et al.

(10) Patent No.: US 6,593,725 B1
(45) Date of Patent: Jul. 15, 2003

(54) FEED-FORWARD CONTROL FOR DC-DC CONVERTERS

(75) Inventors: Kevin J. Gallagher, Co. Cork (IE); Anthony G. Dunne, Co. Cork (IE)

(73) Assignee: Cypress Semiconductor Corp., San Jose, CA (US)

( * ) Notice: Subject to any disclaimer, the term of this patent is extended or adjusted under 35 U.S.C. 154(b) by 121 days.

(21) Appl. No.: 09/790,749

(22) Filed: Feb. 22, 2001

(51) Int. Cl.[7] .................................................. G05F 1/44
(52) U.S. Cl. ......................... 323/284; 323/275; 323/299
(58) Field of Search ................................. 323/282, 283, 323/284, 285, 288, 299, 351; 363/89, 97

(56) References Cited

U.S. PATENT DOCUMENTS 5,675,240 A * 10/1997 Fujisawa et al. ............ 323/282
6,049,473 A * 4/2000 Jang et al. .................. 363/89

OTHER PUBLICATIONS

Specification of the Bluetooth System, Specification vol. 1, Version 1.0, Dec. 1, 1999, pp. 1–1080.
Specification of the Bluetooth System, Specification vol. 2, Version 1.0, Dec. 1, 1999, pp. 1–438.

* cited by examiner

*Primary Examiner*—Jessica Han
(74) *Attorney, Agent, or Firm*—Christopher P. Maiorana, P.C.

(57) ABSTRACT

An apparatus comprising a first circuit and a second circuit. The first circuit may be configured to regulate an output voltage generated in response to an input signal and a feedback of the output voltage. The second circuit may be configured to further regulate the output voltage in response to the input signal.

20 Claims, 4 Drawing Sheets

FEED-FORWARD CONTROL FOR DC-DC CONVERTERS

FIELD OF THE INVENTION

The present invention relates to a method and/or architecture for voltage feed-forward devices generally and, more particularly, to a method and/or architecture for voltage feed-forward control for DC-DC devices.

BACKGROUND OF THE INVENTION

Conventional DC-DC converters (or step up devices) can be used to generate DC supply voltages of a particular voltage when only a lower voltage is available. For example, battery operated devices may require such a voltage increase. Conventional step up devices implement either one or two feedback loops. A first feedback is a voltage feedback from the output. A second feedback is a current feedback from the input. Such conventional approaches are relatively slow to respond to changes in the input voltage Vin.

It would be desirable to provide a DC-DC converter where changes in the input voltage Vin are tracked quickly. Applications for such an implementation can be important where a stable output voltage is required.

SUMMARY OF THE INVENTION

The present invention concerns an apparatus comprising a first circuit and a second circuit. The first circuit may be configured to regulate an output voltage generated in response to an input signal and a feedback of the output voltage. The second circuit may be configured to further regulate the output voltage in response to the input signal.

The objects, features and advantages of the present invention include providing a method and/or architecture for implementing a voltage feed-forward control for DC-DC devices that may (i) respond to changes in an input voltage by quickly tracking the input voltage, which may allow faster regulation, (ii) provide a stable output voltage, (iii) approach a steady-state value in a shorter timescale when compared with conventional approaches, (iv) offer a large range of input voltages over which the output can be well regulated, (v) use an input-dependent offset with an existing ramp/sawtooth signal to regulate the output voltage, and/or (vi) implement a fast/tight regulation of the output voltage.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
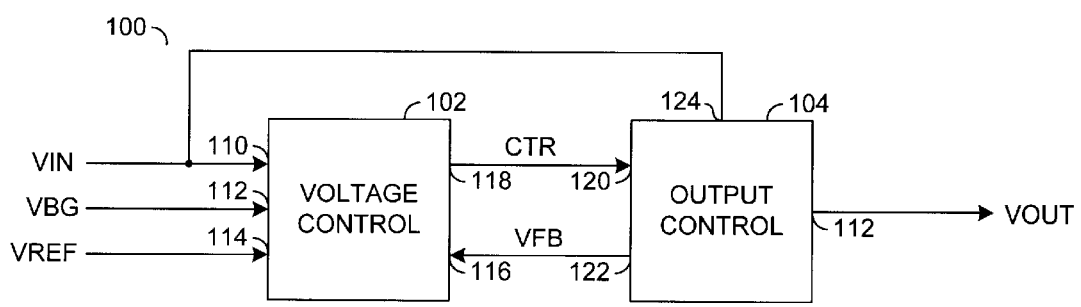
FIG. 1 is a block diagram of a preferred embodiment of the present invention.

Referring to FIG. 1, a block diagram of a circuit 100 is shown in accordance with a preferred embodiment of the present invention. The circuit 100 generally comprises a block (or circuit) 102 and a block (or circuit) 104. The circuit 102 may be implemented as a voltage control circuit. The circuit 104 may be implemented as an output control circuit. The circuit 102 may have an input 110 that may receive an input voltage (e.g., VIN), an input 112 that may receive a bandgap voltage (e.g., VBG), an input 114 that may receive a reference voltage (e.g., VREF), and an input 116 that may receive a feedback voltage (e.g., VFB). The circuit 102 may also have an output 118 that may present a signal (e.g., CTR) to an input 120 of the output control circuit 104. The output control circuit 104 may have an output 112 that presents a signal (e.g., VOUT) and an output 122 that may present the signal VFB. The output control circuit 104 may also have an input 124 that may receive the signal VIN.

The circuit 100 may generate the signal VOUT. The signal VOUT may have a higher voltage than the signal VIN. The circuit 100 may therefore be used as a DC-DC converter (e.g., step up circuit, voltage regulator circuit, etc.). The circuit may be particularly useful in generating a stable supply voltage from a portable source that may have a wide operating range, such as a battery. Such voltage regulation of battery supplies may be needed in devices such as Bluetooth devices (e.g., see the Bluetooth Specification, Version 1.0B, published December 1999, the relevant portions of which are incorporated by reference in their entirety).

Figure 2:
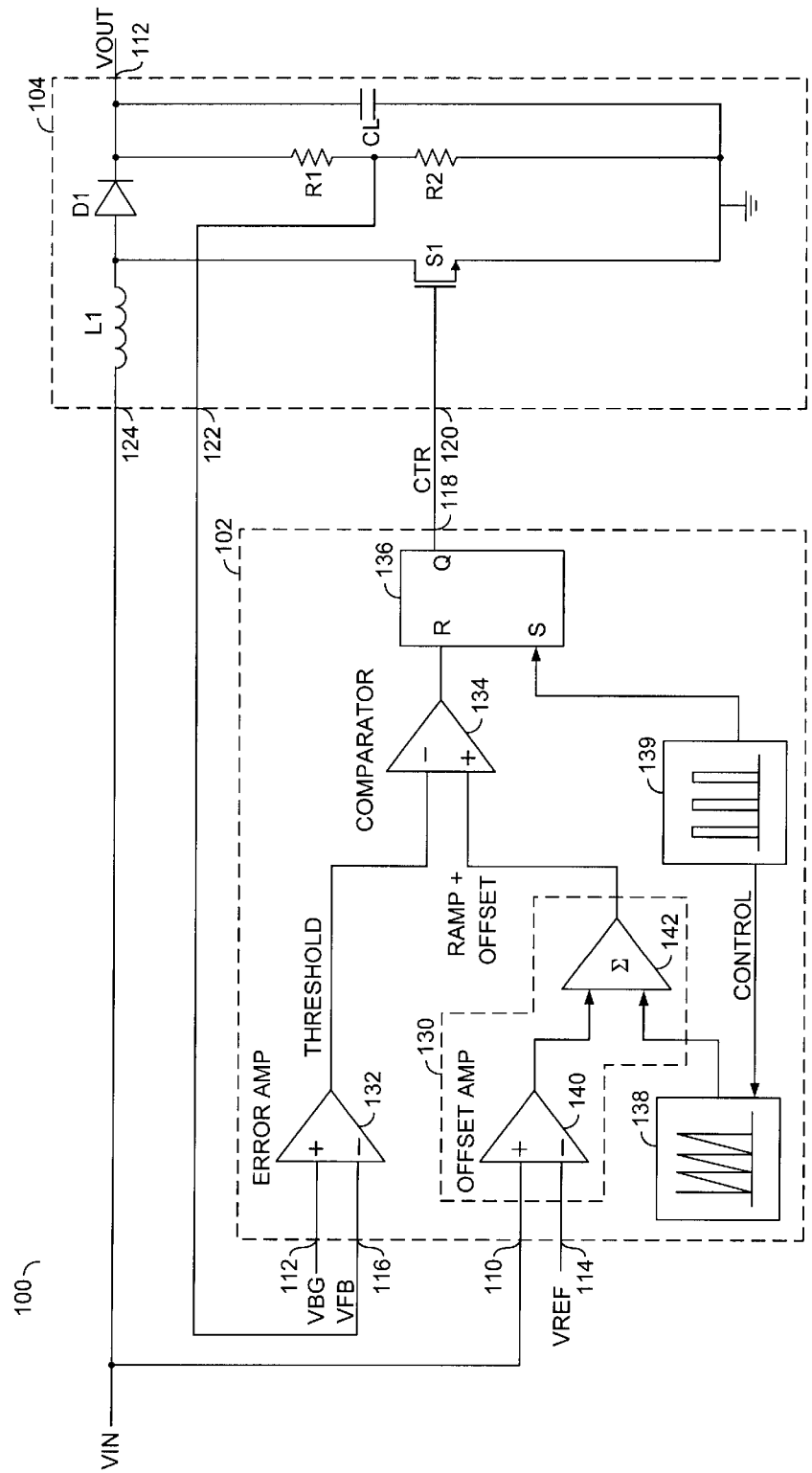
FIG. 2 is a detailed block diagram of the circuit of FIG. 1.

Referring to FIG. 2, a more detailed diagram of the circuit 100 is shown. The voltage control circuit 102 is shown comprising a circuit 130, a circuit 132, a circuit 134, a circuit 136, a circuit 138 and a circuit 139. The circuit 130 may be a feed forward circuit. The circuit 130 generally comprises a circuit 140 and a circuit 142. The circuit 138 may be implemented as a sawtooth generating circuit (e.g., a circuit that generates a sawtooth waveform in response to a periodic signal). The circuit 139 may be implemented as an oscillator circuit. In one example, the circuit 139 may be implemented, as an on-board oscillator (e.g., fabricated on the same integrated circuit as the circuit 100). However, the circuit 139 may also be implemented as an external oscillator. The error amplifier 132 may not require a high-gain implementation, which generally helps reduce oscillations on the output voltage VOUT.

The circuit 140 may be implemented as an operational amplifier. The circuit 142 may be implemented as a summation circuit 142. The circuit 132 may be implemented as operational amplifier circuit. The circuit 134 may be implemented as a comparator circuit. The circuit 136 may be implemented as a flip-flop, such as an RS flip-flop. However, other types of flip-flops may be implemented accordingly to meet the design criteria of a particular implementation. The output circuit 104 generally comprises an inductor L1, a diode D1, a resistor R1, a resistor R2, a capacitor CL and a switch S1. The implementation of the output circuit 104 is shown as an exemplary embodiment. Other output circuits that regulate an output voltage may be implemented accordingly to meet the design criteria of a particular implementation. However, the switch S1 is generally included in the circuit 104 to provide voltage regulation in response to the circuit 102. In one example, the switch S1 may be implemented as a NPN bipolar device or an NMOSFET device. However, a particular implementation of the switch S1 may be varied.

The inductor L1, the switch S1, the diode D1, and the load capacitor CL may be implemented as standard components of a converter. The standard components may be implemented as switchmode regulator (e.g., no pass transistor is implemented). At the start of every cycle, the oscillator 139 may set the flip-flop 136 high, turning on the switch S1 and turning on a signal (e.g., RAMP+OFFSET). While the switch S1 is on current may build up linearly through the inductor L1. For a portion of the cycle, the diode D1 is off (e.g., reverse-biased) and the capacitor CL may supply current to the load (during a steady-state). Eventually, the signal composed of the signal RAMP+OFFSET crosses the threshold from the error amplifier 132 and resets the flip-flop 136, turning off the switch S1. Since the current through an inductor L1 is forced to be continuous, the diode D1 becomes forward-biased, and current is presented to the load capacitor CL, effectively replenishing the charge lost during the first half of the cycle.

During a steady state, the threshold remains at a level such that the output VOUT may be constant. In a steady-state, the current through the inductor L1 is generally a triangular waveform and may have a DC value IL(av) The input power is therefore IL(av)*VIN. Since power is lost in the diode D1 and the switch S1 (as well as the control circuitry), the converter (L1, S1, D1 and CL) may have an efficiency of approximately 80%. Since the converter (L1, S1, D1 and CL) is generally implemented as a step-up converter, a current less than IL(av) can only be supplied. A change in (i) VOUT, (ii) demand for load current or (iii) a change in VIN may upset the steady-state conditions. For (i) and (ii), the resistor divider R1 and R2 may feed back the signal VFB to the error amplifier 132. When VOUT is at the desired level, VBG=VFB and the threshold remains at a particular DC level. Changes in (i) or (ii) may alter VFB and the threshold may change, remaining at a new level if the changes become steady-state, or returning to the same level if they are only transient. A change in (iii) may change the ramp offset and alter the duty cycle, regulating the output VOUT. However, in a steady-state, the threshold may also self-adjust to the new condition. The voltage feed circuit 100 may forward regulate the output VOUT against a change in the input VIN quickly.

The circuit 100 may provide feed-forward control for DC-DC converters. The voltage feed-forward of the circuit 130 may be used to provide an offset to the sawtooth ramp signal generated by the circuit 138. The signal RAMP+ OFFSET may be compared by the comparator 134 with the output signal (e.g., THRESHOLD) of the circuit 132. The comparator 134 may provide a first input (e.g., R) to the flip-flop 136 while the oscillator circuit 139 may provide a second input (e.g., S) to the flip-flop 136. The flip-flop 136 in turn generates the signal CTR that adjusts the duty cycle received by the gate of the switch S1. The signal CTR regulates the voltage of the signal VOUT accordingly. The voltage feed-forward of the circuit 100 may be used as an alternative/additional technique for regulating VOUT in DC-DC converters in addition to other regulator techniques.

The circuit 130 generally provides the feed forward effect. The amplifier 140 provides a fixed pre-determined gain. The output of the amplifier 140 is generally an amplified signal representing the difference between the reference voltage VREF and the input voltage VIN.

When comparing the voltage feed-forward architecture of the circuit 100 to a voltage or current mode control (e.g., feed-back systems), the circuit 100 provides a quicker response to changes in the input voltage VIN. In contrast, feedback systems have an inherent delay. With voltage feed-forward of the circuit 100, the input voltage VIN is fed directly into an input of the amplifier 140, while a second input of the amplifier 140 receives the reference voltage VREF. The amplifier 140 can quickly respond to line changes, without the need for current or voltage to be sensed. When the output of the circuit 130 is used as an offset to the ramp signal present in many existing architectures, a feed-forward control mechanism generally regulates the output voltage VOUT against changes in the input voltage VIN.

Figure 3:
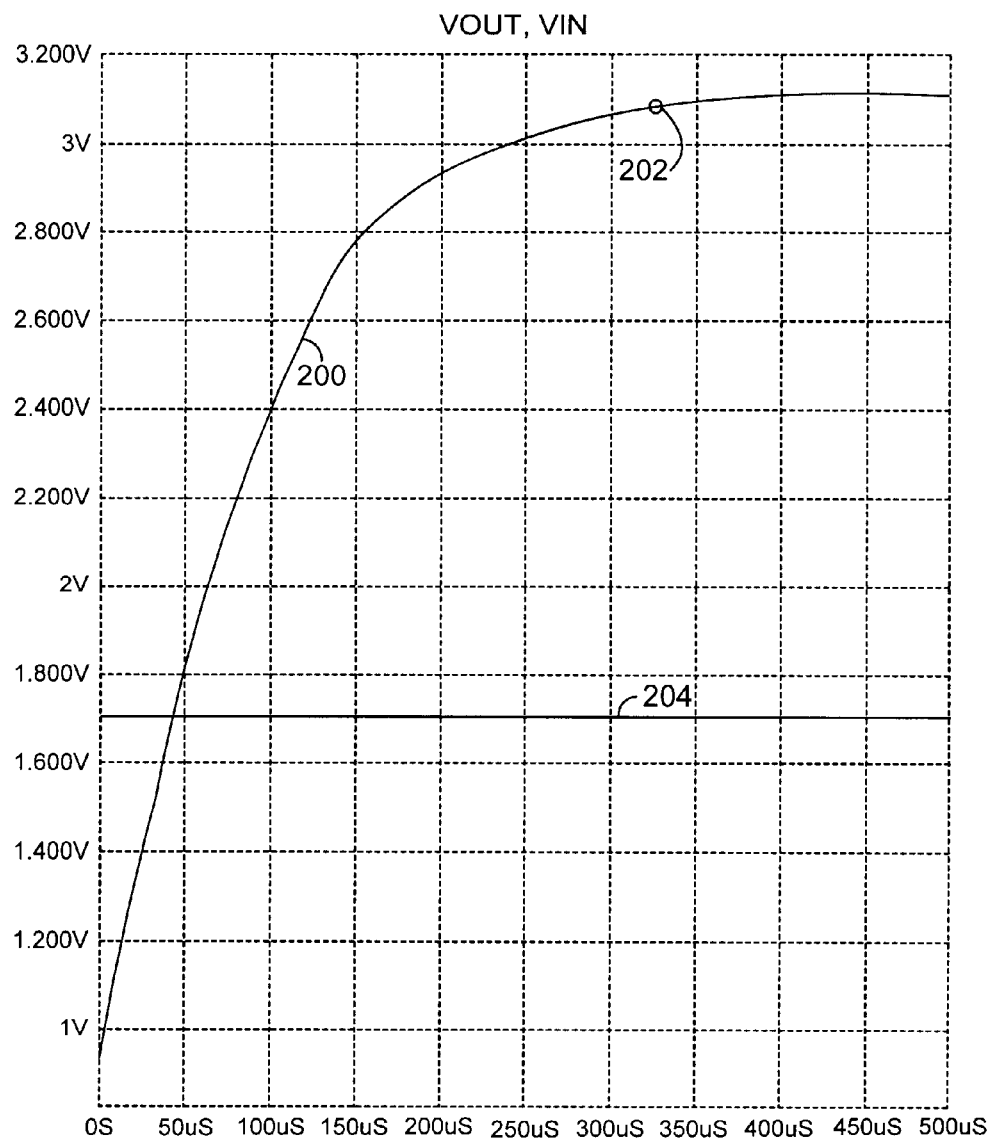
FIG. 3 is a simulation plot illustrating an operation of the present invention.
Figure 4:
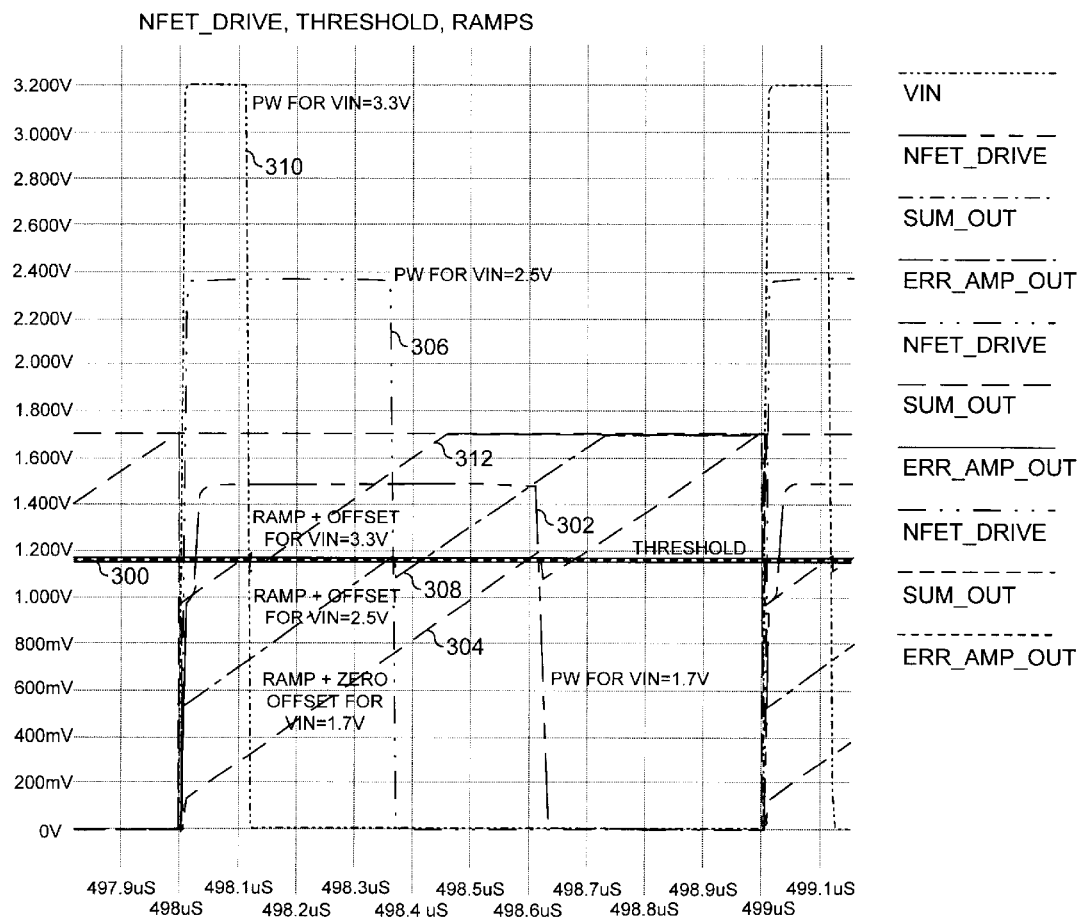
FIG. 4 is a simulation plot, illustrating an operation of the present invention.

Referring to FIGS. 3 and 4, example simulations illustrating a typical output voltage VOUT in response to an input voltage VIN are shown. Also, the voltage feed-forward architecture 130 regulates the duty cycle of the signal CTR as a function of the input voltage VIN, which in turn regulates VOUT.

In particular, the waveform of FIG. 3 shows an X-axis in microseconds and a Y-axis in volts. Between 0 and 300 microseconds, the waveform 200 is shown ramping up. After about 300 to 350 microseconds, or near the point 202, the output voltage is essentially at the DC state of about 3.1 volts. The plot 204 shows a steady state input voltage of approximately 1.7 volts. Therefore, the circuit 100 steps up the 1.7 volt signal to approximately 3.1 volts, in a time of around 300 to 350 microseconds. Conventional approaches (e.g., without the present invention) may take as long as 1 millisecond (or more) to reach a steady state voltage. The circuit 100 may provide bursts of current during each cycle of the signal CTR that may increase the voltage output VOUT.

Referring in more detail to FIG. 4, examples of duty cycles of the signal CTR and threshold voltages of the present invention are shown. For example, a threshold voltage (e.g., the output of the amplifier 132) of about 1.2 volts is shown as the waveform 300. A waveform 304 illustrates a ramp output of the amplifier 142 for the example of an input voltage VIN of 1.7 volts. The waveform 302 may represent the signal CTR for an input voltage VIN of 1.7 volts. The waveform 302 (or the signal CTR) may control the switch S1 and set a particular duty cycle of the waveform 302. In one example, the period of the waveform 302 may be approximately 60 percent. As the waveform 304 passes the threshold voltage 300, the signal 302 turns from a digital high (or "on") to a digital low (or "off"). Similarly, the waveform 306 and the waveform 308 illustrate examples where the input voltage is 2.5 volts. The waveforms 310 and 312 illustrate examples where the input is 3.3 volts. In general, the larger the potential between the input voltage VIN and the output voltage VOUT, the higher a duty cycle of the waveforms 302, 306 and 310.

With the circuit 100, changes in the input voltage VIN are tracked quickly, allowing faster regulation of the output voltage VOUT. A quick response is important where a stable output voltage VOUT is required as the input voltage VIN changes. Furthermore, the circuit 100 offers a large range of variation in the input voltage VIN over which the output voltage VOUT can be well regulated. This may be useful in applications that generate a supply voltage in response to batteries or other varying voltages. The feed-forward control architecture of the circuit 100 responds quickly to changes in the input voltage VIN.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to (i) regulate an output voltage generated from an input signal in response to a control signal and (ii) generate a feedback signal proportional to said output voltage; and
   a second circuit configured to generate said control signal in response to (i) a first difference between said feedback signal and a first reference voltage and (ii) a second difference between said input signal and a second reference voltage.

2. The apparatus according to claim 1, wherein said second circuit is further configured to generate said control signal in response to a periodic signal.

3. The apparatus according to claim 1, wherein said second circuit comprises:
   a feed forward circuit configured to generate a ramp signal in response to a sawtooth signal to control a duty cycle of said control signal.

4. The apparatus according to claim 3, wherein said feed forward circuit is further configured to offset said ramp signal in amplitude in response to said second difference between said input signal and said second reference voltage to adjust said duty cycle of said control signal.

5. The apparatus according to claim 3, wherein said second circuit further comprises:
   a sawtooth generator circuit configured to generate said sawtooth signal in response to a periodic signal.

6. The apparatus according to claim 5, wherein said second circuit further comprises:
   an oscillator circuit configured to generate said periodic signal.

7. The apparatus according to claim 5, further comprising:
   an oscillator circuit external to said second circuit and configured to generate said periodic signal.

8. The apparatus according to claim 3, wherein said second circuit further comprises:
   a comparator configured to adjust said duty cycle of said control signal in response to a third difference between said ramp signal and said first difference.

9. The apparatus according to claim 1, wherein said first circuit further comprises:
   a switch configured to control said output voltage.

10. The apparatus according to claim 9, wherein said second circuit comprises a flip-flop directly connected to said switch.

11. The apparatus according to claim 9, wherein said switch has one node directly connected to a voltage ground.

12. The apparatus according to claim 1, wherein said second reference voltage is independent of said input signal.

13. An apparatus comprising:
    means for (i) regulating an output voltage generated from an input signal in response to a control signal;
    means for generating a feedback signal proportional to said output voltage; and
    means for generating said control signal in response to (i) a first difference between said feedback signal and a first reference voltage and (ii) a second difference between said input signal and a second reference voltage.

14. A method for providing feed-forward control for DC-DC converters, comprising the steps of:
    (A) regulating an output voltage generated from an input signal in response to a control signal;
    (B) generating a feedback signal proportional to said output voltage; and
    (C) generating said control signal in response to (i) a first difference between said feedback signal and a first reference voltage and (ii) a second difference between said input signal and a second reference voltage.

15. The method according to claim 14, wherein step (C) is further responsive to a periodic signal.

16. The method according to claim 14, further comprising the step of:
    controlling a duty cycle of said control signal in response to a sawtooth signal.

17. The method according to claim 16, further comprising the step of:
    generating said sawtooth signal in response to a periodic signal.

18. The method according to claim 17, further comprising the steps of:
    generating a ramp signal in response to said sawtooth signal; and
    offsetting said ramp signal in amplitude in response to said second difference to adjust said duty cycle of said control signal.

19. The method according to claim 18, further comprising the step of:
    generating a third difference between said ramp signal and said first difference to adjust said duty cycle of said control signal.

20. The method according to claim 14, wherein said second reference voltage is independent of said input signal.

* * * * *